United States Patent [19]
Bhadkamkar et al.

[11] Patent Number: 6,002,776
[45] Date of Patent: *Dec. 14, 1999

[54] DIRECTIONAL ACOUSTIC SIGNAL PROCESSOR AND METHOD THEREFOR

[75] Inventors: Neal Ashok Bhadkamkar, Palo Alto; John-Thomas Calderon Ngo, Sunnyvale, both of Calif.

[73] Assignee: Interval Research Corporation, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/531,143

[22] Filed: Sep. 18, 1995

[51] Int. Cl.$^6$ ..................................................... H04B 3/20
[52] U.S. Cl. ............................... 381/66; 381/93; 379/410
[58] Field of Search ................................. 381/66, 94, 93, 381/96, 94.1, 94.7; 379/410, 390, 395, 406; 455/33.1

[56] References Cited

U.S. PATENT DOCUMENTS

| | | |
|---|---|---|
| 3,500,000 | 3/1970 | Kelly, Jr. et al. . |
| 4,544,926 | 10/1985 | Giuli ...................................... 343/18 E |
| 4,750,147 | 6/1988 | Roy et al. . |
| 4,751,738 | 6/1988 | Widrow et al. . |
| 5,208,786 | 5/1993 | Weinstein et al. ....................... 367/124 |
| 5,315,532 | 5/1994 | Comon . |
| 5,371,789 | 12/1994 | Hirano .................................... 379/410 |
| 5,383,164 | 1/1995 | Sejnowski et al. ..................... 455/33.1 |
| 5,465,302 | 11/1995 | Lazzari et al. . |

OTHER PUBLICATIONS

Jeffery C. Allen, "Advanced Beamforming Concepts: Source Localization Using the Bispectrum, Gabor Transform, Wigner–Ville Distribution, and Nonstationary Signal Representations," 25th Asilomar Conference on Signals, Systems, and Computers, vol. 2, 818–824, 1991.

Yeheskel Bar–Ness, "Broadband Interference Cancelation Using a Bootstrapped Approach," ICASSP '93 vol. III,, 372–375, 1993.

Zaka U. Bhatti and Steven Bibyk, "Adaptive Analog Circuits to Perform Signal Separation of Multidimensional Sensor Signals," IEEE International Conference on Systems Engineering, 391–394, Dayton, OH, Aug. 1–3, 1991.

Jean–Francois Cardoso, "Source Separation Using Higher Order Moments," ICASSP '89, 2109–2112, 1989.

Jean–Francois Cardoso, "Super–Symmetric Decomposition of the Fourth–Order Cumulant Tensor. Blind Identification of More Sources than Sensors," ICASSP '91, vol. V, 3109–3112, 1991.

Jean–Francois Cardoso, Adel Belouchrani, and Beate Leheld, "A New Composite Criterion for Adaptive and Iterative Blind Source Separation," ICASSP '94, vol. IV, revised version, pp. 1–4.

(List continued on next page.)

*Primary Examiner*—Ping Lee
*Attorney, Agent, or Firm*—Limbach & Limbach L.L.P.

[57] ABSTRACT

Two or more microphones are mounted in an environment that contains an equal or lesser number of distinct sound sources. Acoustic energy from each source, with its attendant echoes and reverberation, impinges on each microphone. Using direction-of-arrival information, a first module attempts to extract the original source signals as if the acoustic environment were anechoic. Any residual crosstalk between the channels, which may be caused by echoes and reverberation, is removed by a second module. The first and second modules may be implemented using existing technology.

24 Claims, 3 Drawing Sheets

Microfiche Appendix Included
(1 Microfiche, 46 Pages)

OTHER PUBLICATIONS

Marc H. Cohen, "Analog VLSI Implementation of an Auto–Adaptive Synthetic Neutral Network for Real–Time Separation of Independent Signal Sources," Master's Thesis, Johns Hopkins University, May 1991.

Pierre Comon, Christian Jutten, and Jeanny Herault, "Blind Separation of Sources, Part II: Problems [sic] Statement," Signal Processing 24, 11–20, 1991.

Abdulkadir Dinc and Yeheskel Bar–Ness, A Forward/Backward Bootstrapped Structure for Blind Separation of Signals in a Multi–Channel Dispersive Environment, ICASSP '94, III, 376–379.

K. Farrell, RJ. Mammone, and J.L. Flanagan, "Beamforming Microphone Arrays for Speech Enhancement," ICASSP '92, vol. 1, 285–288, 1992.

J.L. Flanagan, J.D. Johnson, R. Zahn, and G.W. Elko, "Computer–Steered Microphone Arrays for Sound Transduction in Large Rooms," Journal of the Acoustical Society of America, 78(5), pp. 1508–1518, 1985.

O.L. Frost III, "An algorithm for linearly constrained adaptive array processing," Proceedings of the IEEE, 60(8), pp. 926–935, Aug. 1972.

L.J. Griffiths and C.W. Jim, "An alternative approach to linearly constrained adaptive beamforming," IEEE Transactions on Antennas and Propagation, AP–30(1), pp. 27–34, Jan. 1982.

C.W.K. Gritton and D.W. Lin, "Echo Cancellation Algorithms," IEEE ASSP Magazine, Apr. 30–38, 1984.

J.Herault and C. Jutten, "Space or Time Adaptive Signal Processing by Neutral Network Models", AIP Conference Proceedings, pp. 206–211, Snowbird, Utah 1986.

C. Jutten, L. Nguyen Thi, E. Djikstra, E. Vittoz, and J. Caelen, "Blind Separation of Sources: An Algorithm for Separation of Convolutive Mixtures," Higher Order Statistics, 275–278, 1992.

J.L. Lacoume and P. Ruiz, "Separation of Independent Sources of Correlated Inputs," IEEE Trans. Signal Processing 40(12), Dec. 1992.

Richard F. Lyon, "A Computational Model of Binaural Localization and Separation," ICASSP '83, 319–327, 1983.

David K. Mellinger, "Event Formation and Separation in Musical Sound," Ph.D. Dissertation, Stanford University, Dec. 1991.

O.M. Mracek Mitchell, Carolyn A. Ross, and G.H. Yates, "Signal Processing for a Cocktail Party Effect," Journal of the Acoustical Society of America 50(2), pp. 656–660, 1971.

L. Molgedey and H.G. Schuster, "Separation of a Mixture of Independent Signal Using Time Delayed Correlations," Physical Review Letters 72(23), 3634–3637, Jun. 6, 1994.

Tatsuya Morita, "Separation of Mixed Voices by Acoustic Parameter Optimization," Electronics and Communications in Japan, Part 3: Fundamental Electronic Science 74(5), 30–38, 1991.

Montse Najar, Miguel A. Lagunas, and Ignasi Bonet, "Blind Wideband Source Separation," ICASSP '94, vol. IV, 65–68, 1994.

J. Naylor and J. Porter, "An Effective Speech Separation System Which Requires No A Priori Information," ICASSP '91, vol. II, 937–940, 1991.

Harry F. Olson, "Directional Microphones", Journal of the Audio Engineering Society, pp. 190–194, Oct., 1967.

Thomas W. Parsons, "Separation of Speech from Interferring Speech by Means of Harmonic Selection," J. Acoust. Soc. Am. 60(4), 911–918, 1976.

John C. Platt and Federico Faggin, "Networks for the Separation of Sources that are Superimposed and Delayed," NIPS '91, pp. 730–737, 1992.

Richard Roy, "ESPRIT—Estimation of Signal Parameters via Rotational Invariance Techniques," Ph.D. dissertation, Stanford University, Stanford, CA 1987.

R.O. Schmidt, "A Signal Subspace Approach to Multiple Emitter Location and Spectral Estimation," Ph.D. Dissertation, Stanford University, Stanford, CA 1981.

Hans Werner Strube, "Separation of Several Speakers Recorded by Two Microphones (Cocktail–Party Processing)," Signal Processing 3, 355–364, 1981.

Lang Tong, Ruey–wen Liu, Victor C. Soon, and Yih–Fang Huang, Indeterminacy and Identifiability of Blind Identification, IEEE Trans. Circuits and Systems 38(5), 499–509, May 1991.

Lang Tong, Yujiro Inouye, and Rueywen Liu, "Eigenstructure–Based Blind Identification if Independent Signals," ICASSP '91, 3329–3332, 1991.

Dirk Van Compernolle, "Adaptive Filter Structures for Enhancing Cocktail Party Speech from Multiple Microphone Recordings," 1989.

Dirk Van Compernolle, Weiya Ma, Fei Xie, and Marc Van Diest, "Speech Recognition in Noisy Environments with the Aid of Microphone Arrays," Speech Communication 9, 433–442, 1990.

Ch. von der Malsburg and W. Schneider, "A Neural Cocktail–Party Processor," Biological Cybernetics 54, 29–40, 1986.

Mitchel Weintraub, "The GRASP Sound Separation System," ICASSP '84, 18A.6.1–18A.6.4, 1984.

Product Spec. Sheet, "Bose Aviation Headset," Bose Corporation, Framingham, Mass.

Product Spec. Sheet, "Knowles CF 2949 Data Sheet," Knowles Electronics, Inc., Itasca, Ill.

Product Spec. Sheet, "NCT proACTIVE Series," Noise Cancellation Technologies, Inc., Stamford, Conn.

Product Spec. Sheet, "Sennheiser HDC 451 NoiseGard Mobile Headphone," Sennheiser Electronic Corporation, Old Lyme, Conn.

Jean–Francois Cardoso and Eric Moulines, "Minimum Contrast Estimation with Applications to Array Processing," ICASSP '93, vol. IV, 384–387, 1993.

Yves Grenier, "A Microphone Array for Car Environments," Speech Communication 12, 25–39, 1993.

J.J. Hopfield, "Olfactory Computation and Object Perception," Proc. Natl. Acad. Sci. USA 88, 6462–6466, Aug. 1991.

Yutaka Kaneda, "Sound Source Localization for Wide–Band Signals Under a Reverberant Condition," J. Acoust. Soc. Japan (E), 14(1), 47–48, 1993.

Miguel A. Lagunas and Alba Pages, "Multitone Tracking with Coupled EKFs and High Order Learning," ICASSP '92, vol. V, 153–156, 1992.

F. Laichi, T. Aboulnasr, and W. Steenaart, "A New Efficient Implementation of the AIFIR Echo Tail Canceller for ISDN Application," ICASSP '91, 1545–1548, 1991.

Eric Moulines and Jean–Francois Cardoso, "Direction Finding Algorithms Using Fourth Order Statistics. Asymptotic Performance Analysis," ICASSP '92, vol. II, 437–440, 1992.

Montse Najar, Miguel A. Lagunas, and Ana I. Perez–Neira, "Source Separation Based on Coupled Single DOA Estimation Processors," ICASSP '93, vol. IV, 336–339, 1993.

Patrick M. Peterson, Nathaniel I. Durlach, William M. Rabinowitz, and Patrick M. Zurek, "Multimicrophone Adaptive Beamforming for Interference Reduction in Hearing Aids," Journal of Rehabilitation Research and Development 24(4), 103–110, Fall 1987.

Richard Roy and Thomas Kailath, "ESPRIT—Estimation of Signal Parameters via Rotational Invariance Techniques," Optical Engineering 29(4), 296–313, Apr. 1990.

Richard Roy and Thomas Kailath, "ESPRIT—Estimation of Signal Parameters Via Rotational Invariance Techniques," IEEE Trans. Acoust., Speech and Signal Processing 37(7), 984–995, Jul. 1989.

Harvey F. Silverman and Stuart E. Kirtman, "A Two–Stage Algorithm for Determining Talker Location from Linear Microphone Array Data," Computer Speech and Language 6, 129–152, 1992.

Richard M. Stern, Jr. and H. Steven Colburn, "Theory of Binaural Interaction Based on Auditory–Nerve Data. IV. A Model for Subjective Lateral Position," J. Acoust. Soc. Am. 64(1), Jul. 1978.

Noboru Sugie, Jie Huang, and Noboru Ohnishi, "Localizing Sound Source by Incorporating Biological Auditory Mechanism," IEEE Int'l Conf. on Neural Networks, II–243–250, 1988.

W.M. Wagenaars, "Localization of Sound in a Room with Reflecting Walls," J. Audio Eng. Soc. 38(3), 99–110, Mar. 1990.

Leland B. Jackson, "Digital Filters and Signal Processing", p. 146, 1986.

Gordon E. Peterson, "Session F. Speech Intelligibility and Perception", J. Acoust. Society, 32(7), Jul. 1960, p. 918.

Mitchell Weintraub "A Theory and Computational Model of Auditory Monaural Sound Separation", Ph.D. Dissertation, Department of Electrical Engineering, Stanford University, Aug. 1985.

Mitchel Weintraub "Computational Model for Separating Two Simultaneous Talkers," ICASSP '86, pp. 81–84, 1986.

DIRECTIONAL ACOUSTIC SIGNAL PROCESSOR AND METHOD THEREFOR

This application is submitted with a microfiche appendix, containing copyrighted material, Copyright 1994, Interval Research Corporation. The Appendix consists of one (1) microfiche with forty-six (46) frames. The copyright owner has no objection to the facsimile reproduction by anyone of the patent document or the patent disclosure, as it appears in the Patent and Trademark Office patent file or records, but otherwise reserves all copyright rights whatsoever in the appendices.

TECHNICAL FIELD

This invention relates to the field of microphone-array signal processing, and more particularly to a two stage processor for extracting one substantially pure sound signal from a mixture of such signals even in the presence of echoes and reverberations.

BACKGROUND OF THE INVENTION

It is well known that a human being can focus attention on a single source of sound even in an environment that contains many such sources. This phenomenon is often called the "cocktail-party effect."

Considerable effort has been devoted in the prior art to solve the cocktail-party effect, both in physical devices and in computational simulations of such devices. One prior technique is to separate sound based on auditory scene analysis. In this analysis, vigorous use is made of assumptions regarding the nature of the sources present. It is assumed that a sound can be decomposed into small elements such as tones and bursts, which in turn can be grouped according to attributes such as harmonicity and continuity in time. Auditory scene analysis can be performed using information from a single microphone or from several microphones. For an early example of auditory scene analysis, see Weintraub (1984, 1985, 1986). Other prior art work related to sound separation by auditory scene analysis are due to Parsons (1976), von der Malsburg and Schneider (1986), Naylor and Porter (1991), and Mellinger (1991).

Techniques involving auditory scene analysis, although interesting from a scientific point of view as models of human auditory processing, are currently far too computationally demanding and specialized to be considered practical techniques for sound separation until fundamental progress is made.

Other techniques for separating sounds operate by exploiting the spatial separation of their sources. Devices based on this principle vary in complexity. The simplest such devices are microphones that have highly selective, but fixed patterns of sensitivity. A directional microphone, for example, is designed to have maximum sensitivity to sounds emanating from a particular direction, and can therefore be used to enhance one audio source relative to others (see Olson, 1967). Similarly, a close-talking microphone mounted near a speaker's mouth rejects distant sources (see, for example, the Knowles CF 2949 data sheet).

Microphone-array processing techniques related to separating sources by exploiting spatial separation of their sources are also well known and have been of interest for several decades. In one early class of microphone-array techniques, nonlinear processing is employed. In each output stream, some source direction of arrival, a "look direction," is assumed. The microphone signals are delayed to remove differences in time of flight from the look direction. Signals from any direction other than the look direction are thus misaligned in time. The signal in the output stream is formed, in essence, by "gating" sound fragments from the microphones. At any given instant, the output is chosen to be equal to one of the microphone signals. These techniques, exemplified by Kaiser and David (1960), by Mitchell et al. (1971), and by Lyon (1983), perform best when the undesired sources consist predominantly of impulse trains, as is the case with human speech. While these nonlinear techniques can be very computationally efficient and are of scientific interest as models of human cocktail-party processing, they do not have practical or commercial significance because of their inherent inability to bring about full suppression of unwanted sources. This inability originates from the incorrect assumption that at every instant in time, at least one microphone contains only the desired signal.

One widely known class of techniques in the prior art for linear microphone-array processing is often referred to as "classical beamforming" (Flanagan et al., 1985). As with the nonlinear techniques mentioned above, processing begins with the removal of time-of-flight differences among the microphone signals with respect to the look direction. In place of the "gating" scheme, the delayed microphone signals are simply averaged together. Thus, any signal from the look direction is represented in the output with its original power, whereas signals from other directions are relatively attenuated.

Classical beamforming was employed in a patented directional hearing aid invented by Widrow and Brearley (1988). The degree to which a classical beamformer is able to attenuate undesired sources relative to the desired source is limited by (1) the number of microphones in the array, and (2) the spatial extent of the array relative to the longest wavelength of interest present in the undesired sources. In particular, a classical beamformer cannot provide relative attenuation of frequency components whose wavelengths are larger than the array. For example, an array one foot wide cannot greatly attenuate frequency components below approximately 1 kHz.

Also known from the prior art is a class of active-cancellation algorithms, which is related to sound separation. However, it needs a "reference signal," i.e., a signal derived from only of one of the sources. For example, active noise-cancellation techniques (see data sheets for Bose® Aviation Headset, NCT proACTIVE® Series, and Sennheiser HDC451 Noiseguard® Mobile Headphone) reduce the contribution of noise to a mixture by filtering a known signal that contains only the noise, and subtracting it from the mixture. Similarly, echo-cancellation techniques such as those employed in full-duplex modems (Kelly and Logan, 1970; Gritton and Lin, 1984) improve the signal-to-noise ratio of an outgoing signal by removing noise due to echoes from the known incoming signal.

Techniques for active cancellation that do not require a reference signal are called "blind." They are now classified, based on the degree of realism of the underlying assumptions regarding the acoustic processes by which the unwanted signals reach the microphones. To understand the practical significance of this classification, recall a feature common to the principles by which active-cancellation techniques operate: the extent to which a given undesired source can be canceled by subtracting processed microphone signals depends ultimately on the exactness with which copies of the undesired source in the different microphones can be made to match one another. This depends, in turn, on how accurately the signal processing models the acoustic processes by which the unwanted signals reach the microphones.

One class of blind active-cancellation techniques may be called "gain-based": it is presumed that the waveform produced by each source is received by the microphones simultaneously, but with varying relative gains. (Directional microphones must be employed to produce the required differences in gain.) Thus, a gain-based system attempts to cancel copies of an undesired source in different microphone signals by applying relative gains to the microphone signals and subtracting, but never applying time delays or otherwise filtering. Numerous gain-based methods for blind active cancellation have been proposed; see Herault and Jutten (1986), Bhatti and Bibyk (1991), Cohen (1991), Tong et al. (1991), and Molgedey and Schuster (1994).

The assumption of simultaneity is violated when microphones are separated in space. A class of blind active-cancellation techniques that can cope with non-simultaneous mixtures may be called "delay-based": it is assumed that the waveform produced by each source is received by the various microphones with relative time delays, but without any other filtering. (See Morita, 1991 and Bar-Ness, 1993.) Under anechoic conditions, this assumption holds true for a microphone array that consists of omnidirectional microphones. However, this simple model of acoustic propagation from the sources to the microphones is violated when echoes and reverberation are present.

When the signals involved are narrowband, some gain-based techniques for blind active cancellation can be extended to employ complex gain coefficients (see Strube (1981), Cardoso (1989,1991), Lacoume and Ruiz (1992), Comon et al. (1994)) and can therefore accommodate, to a limited degree, time delays due to microphone separation as well as echoes and reverberation. These techniques can be adapted for use with audio signals, which are broadband, if the microphone signals are divided into narrowband components by means of a filter bank. The frequency bands produced by the filter bank can be processed independently, and the results summed (for example, see Strube (1981) or the patent of Comon (1994)). However, they are computationally intensive relative to the present invention because of the duplication of structures across frequency bands, are slow to adapt in changing situations, are prone to statistical error, and are extremely limited in their ability to accommodate echoes and reverberation.

The most realistic active-cancellation techniques currently known are "convolutive": the effect of acoustic propagation from each source to each microphone is modeled as a convolutive filter. These techniques are more realistic than gain-based and delay-based techniques because they explicitly accommodate the effects of inter-microphone separation, echoes and reverberation. They are also more general since, in principle, gains and delays are special cases of convolutive filtering.

Convolutive active-cancellation techniques have recently been described by Jutten et al. (1992), by Van Compernolle and Van Gerven (1992), by Platt and Faggin (1992), and by Dinc and Bar-Ness (1994). While these techniques have been used to separate mixtures constructed by simulation using oversimplified models of room acoustics, to the best of our knowledge none of them has been applied successfully to signals mixed in a real acoustic environment. The simulated mixtures used by Jutten et al., by Platt and Faggin, and by Dinc and Bar-Ness differ from those that would arise in a real room in two respects. First, the convolutive filters used in the simulations are much shorter than those appropriate for modeling room acoustics; they allowed for significant indirect propagation of sound over only one or two feet, compared with tens of feet typical of echoes and reverberation in an office. Second, the mixtures used in the simulations were partially separated to begin with, i.e., the crosstalk between the channels was weak. In practice, the microphone signals must be assumed to contain strong crosstalk unless the microphones are highly directional and the geometry of the sources is constrained.

To overcome some of the limitations of the convolutive active-cancellation techniques named above, the present invention employs a two-stage architecture. Its two-stage architecture is substantially different from other two-stage architectures found in prior art.

A two-stage signal processing architecture is employed in a Griffiths-Jim beamformer (Griffiths and Jim, 1982). The first stage of a Griffiths-Jim beamformer is delay-based: two microphone signals are delayed to remove time-of-flight differences with respect to a given look direction, and in contrast with classical beamforming, these delayed microphone signals are subtracted to create a reference noise signal. In a separate channel, the delayed microphone signals are added, as in classical beamforming, to create a signal in which the desired source is enhanced relative to the noise. Thus, the first stage of a Griffiths-Jim beamformer produces a reference noise signal and a signal that is predominantly desired source. The noise reference is then employed in the second stage, using standard active noise-cancellation techniques, to improve the signal-to-noise ratio in the output.

The Griffiths-Jim beamformer suffers from the flaw that under reverberant conditions, the delay-based first stage cannot construct a reference noise signal devoid of the desired signal, whereas the second stage relies on the purity of that noise reference. If the noise reference is sufficiently contaminated with the desired source, the second stage suppresses the desired source, not the noise (Van Compernolle, 1990). Thus, the Griffiths-Jim beamformer incorrectly suppresses the desired signal under conditions that are normally considered favorable: when the signal-to-noise ratio in the microphones is high.

Another two-stage architecture is described by Najar et al. (1994). Its second stage employs blind convolutive active cancellation. However, its first stage differs significantly from the first stage of the Griffiths-Jim beamformer. It attempts to produce separated outputs by adaptively filtering each microphone signal in its own channel. When the sources are spectrally similar, filters that produce partially separated outputs after the first stage are unlikely to exist.

Thus, it is desirable to provide an architecture for separation of sources that avoids the difficulties exhibited by existing techniques.

SUMMARY OF THE INVENTION

An audio signal processing system for processing acoustic waves from a plurality of sources, comprising a plurality of spaced apart transducer means for receiving acoustic waves from the plurality of sources, including echoes and reverberations thereof. The transducer means generates a plurality of acoustic signals in response thereto. Each of the plurality of transducer means receives acoustic waves from the plurality of sources including echoes and reverberations thereof, and generates one of the plurality of acoustic signals. A first processing means receives the plurality of acoustic signals and generates a plurality of first processed acoustic signals in response thereto. In the absence of echoes and reverberations of the acoustic waves from the plurality of sources, each of the first processed acoustic signals represent acoustic waves from only one different source. A second processing means receives the plurality of first processed acoustic signals and generates a plurality of second processed acoustic signals in response thereto. In the presence of echoes and reverberations of the acoustic waves from the plurality of sources, each of the second processed acoustic signals represent acoustic waves from only one different source.

DETAILED DESCRIPTION OF THE INVENTION

The present invention is a device that mimics the cocktail-party effect using a plurality of microphones with as many output audio channels, and a signal-processing module. When situated in a complicated acoustic environment that contains multiple audio sources with arbitrary spectral characteristics, it supplies output audio signals, each of which contains sound from at most one of the original sources. These separated audio signals can be used in a variety of applications, such as hearing aids or voice-activated devices.

Figure 1:
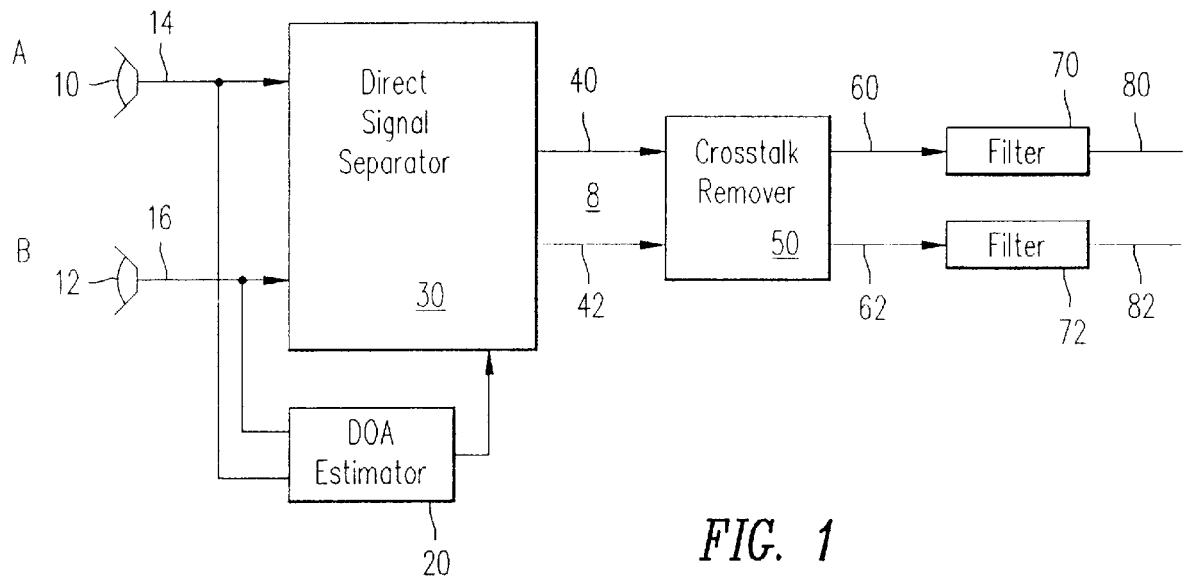
FIG. 1 is a schematic block diagram of an embodiment of an acoustic signal processor of the present invention, using two microphones.

FIG. 1 is a schematic diagram of a signal separator processor of one embodiment of the present invention. As previously discussed, the signal separator processor of the present invention can be used with any number of microphones. In the embodiment shown in FIG. 1, the signal separator processor receives signals from a first microphone 10 and a second microphone 12, spaced apart by about two centimeters. As used herein, the microphones 10 and 12 include transducers (not shown), their associated pre-amplifiers (not shown), and A/D converters 22 and 24 (shown in FIG. 2).

The microphones 10 and 12 in the preferred embodiment are omnidirectional microphones, each of which is capable of receiving acoustic wave signals from the environment and for generating a first and a second acoustic electrical signal 14 and 16 respectively. The microphones 10 and 12 are either selected or calibrated to have matching sensitivity. The use of matched omnidirectional microphones 10 and 12, instead of directional or other microphones leads to simplicity in the direct-signal separator 30, described below. In the preferred embodiment, two Knowles EM-3046 omnidirectional microphones were used, with a separation of 2 centimeters. The pair was mounted at least 25 centimeters from any large surface in order to preserve the omnidirectional nature of the microphones. Matching was achieved by connecting the two microphone outputs to a stereo microphone preamplifier and adjusting the individual channel gains so that the preamplifier outputs were closely matched. The preamplifier outputs were each digitally sampled at 22,050 samples per second, simultaneously. These sampled electrical signals 14 and 16 are supplied to the direct signal separator 30 and to a Direction of Arrival (DOA) estimator 20.

The direct-signal separator 30 employs information from a DOA estimator 20, which derives its estimate from the microphone signals. In a different embodiment of the invention, DOA information could come from an source other than the microphone signals, such as direct input from a user via an input device.

The direct signal separator 30 generates a plurality of output signals 40 and 42. The direct signal separator 30 generates as many output signals 40 and 42 as there are microphones 10 and 12, generating as many input signals 14 and 16 as are supplied to the direct signal separator 30. Assuming that there are two sources, A and B, generating acoustic wave signals in the environment in which the signal processor 8 is located, then each of the microphones 10 and 12 would detect acoustic waves from both sources. Hence, each of the electrical signals 14 and 16, generated by the microphones 10 and 12, respectively, contains components of sound from sources A and B.

The direct-signal separator 30 processes the signals 14 and 16 to generate the signals 40 and 42 respectively, such that in anechoic conditions (i.e., the absence of echoes and reverberations), each of the signals 40 and 42 would be of an electrical signal representation of sound from only one source. In the absence of echoes and reverberations, the electrical signal 40 would be of sound only from source A, with electrical signal 42 being of sound only from source B, or vice versa. Thus, under anechoic conditions the direct-signal separator 30 can bring about full separation of the sounds represented in signals 14 and 16. However, when echoes and reverberation are present, the separation is only partial.

The output signals 40 and 42 of the direct signal separator 30 are supplied to the crosstalk remover 50. The crosstalk remover 50 removes the crosstalk between the signals 40 and 42 to bring about fully separated signals 60 and 62 respectively. Thus, the direct-signal separator 30 and the crosstalk remover 50 play complementary roles in the system 8. The direct-signal separator 30 is able to bring about full separation of signals mixed in the absence of echoes and reverberation, but produces only partial separation when echoes and reverberation are present. The crosstalk remover 50 when used alone is often able to bring about full separation of sources mixed in the presence of echoes and reverberation, but is most effective when given inputs 40 and 42 that are partially separated.

After some adaptation time, each output 60 and 62 of the crosstalk remover 50 contains the signal from only one sound source: A or B. Optionally, these outputs 60 and 62 can be connected individually to post filters 70 and 72, respectively, to remove known frequency coloration produced by the direct signal separator 30 or the crosstalk remover 50. Practitioners skilled in the art will recognize that there are many ways to remove this known frequency coloration; these vary in terms of their cost and effectiveness. An inexpensive post filtering method, for example, consists of reducing the treble and boosting the base.

The filters 70 and 72 generate output signals 80 and 82, respectively, which can be used in a variety of applications. For example, they may be connected to a switch box and then to a hearing aid.

Figure 2:
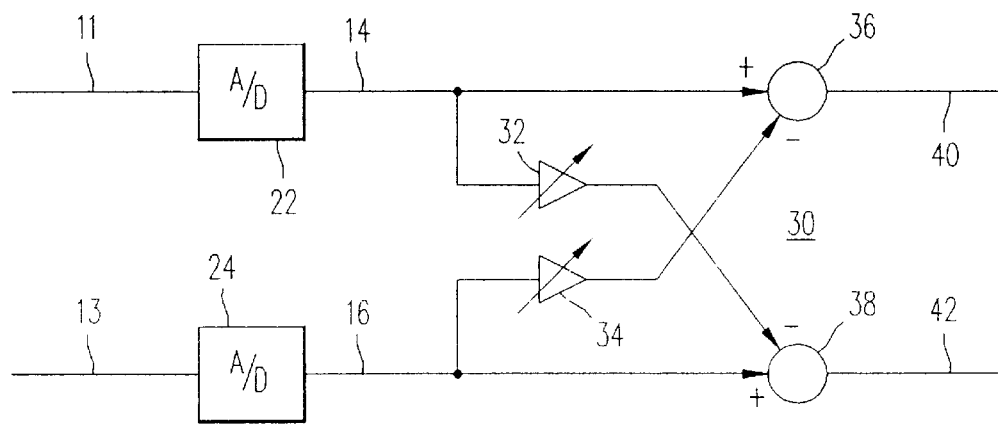
FIG. 2 is a schematic block diagram of an embodiment of the direct-signal separator portion, i.e., the first stage of the processor shown in FIG. 1.

Referring to FIG. 2 there is shown one embodiment of the direct signal separator 30 portion of the signal processor 8 of the present invention. The microphone transducers generate input signals 11 and 13, which are sampled and digitized, by clocked sample-and-hold circuits followed by analog-to-digital converters 22 and 24, respectively, to produce sampled digital signals 14 and 16 respectively.

The digital signal 14 is supplied to a first delay line 32. In the preferred embodiment, the delay line 32 delays the digitally sampled signal 14 by a non-integral multiple of the sampling interval T, which was 45.35 microseconds given the sampling rate of 22,050 samples per second. The integral portion of the delay was implemented using a digital delay line, while the remaining subsample delay of less than one sample interval was implemented using a non-causal, truncated sinc filter with 41 coefficients. Specifically, to implement a subsample delay of t, given that t<T, the following filter is used:

$$y(n) = \sum_{k=-20}^{20} w(k) \ x(n-k)$$

where $x(n)$ is the signal to be delayed, $y(n)$ is the delayed signal, and $w(k)$ {k=-20, -19, . . . 19,20} are the 41 filter coefficients. The filter coefficients are determined from the subsample delay t as follows:

$w(k)=(1/S) \ \mathrm{sinc}\{\pi[(t/T)-k]\}$ where $\mathrm{sinc}(a) = \sin(a)/a$    if a not equal to 0

= 1       otherwise, and S is a normalization factor given by $$S = \sum_{k=-20}^{20} \mathrm{sinc}\{\pi[(t/T)-k]\}.$$

The output of the first delay line 32 is supplied to the negative input of a second combiner 38. The first digital signal 14 is also supplied to the positive input of a first combiner 36. Similarly, for the other channel, the second digital signal 16 is supplied to a second delay line 34, which generates a signal which is supplied to the negative input of the first combiner 36.

In the preferred embodiment, the sample-and-hold and A/D operations were implemented by the audio input circuits of a Silicon Graphics Indy workstation, and the delay lines and combiners were implemented in software running on the same machine.

However, other delay lines such as analog delay lines, surface acoustic wave delays, digital low-pass filters, or digital delay lines with higher sampling rates, may be used in place of the digital delay line 32, and 34. Similarly, other combiners, such as analog voltage subtractors using operational amplifiers, or special purpose digital hardware, may be used in place of the combiners 36 and 38.

Figure 4:
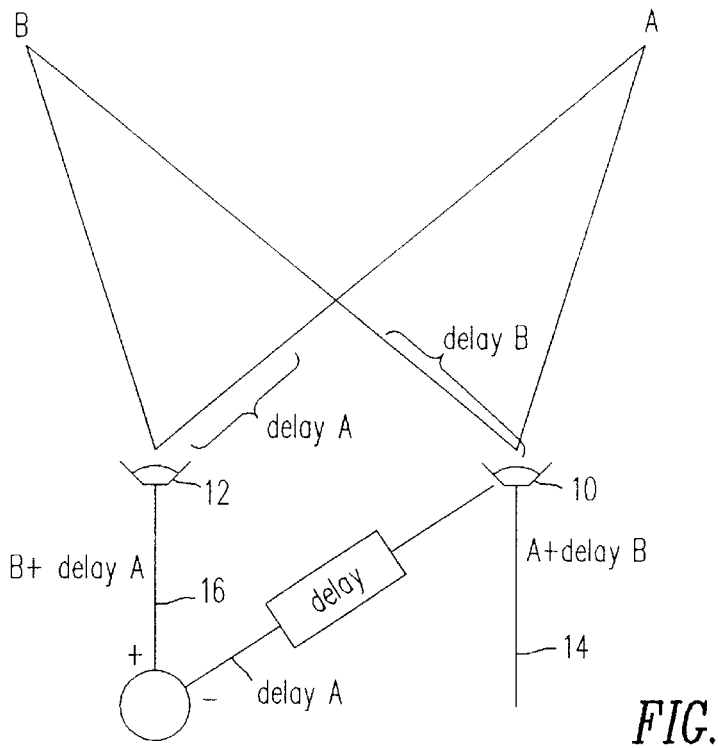
FIG. 4 is an overview of the delay in the acoustic waves arriving at the direct signal separator portion of the signal processor of FIG. 1, and showing the separation of the signals.

Schematically, the function of the direct signal separator 30 may be seen by referring to FIG. 4. Assuming that there are no echoes or reverberations, the acoustic wave signal received by the microphone 12 is the sum of source B and a delayed copy of source A. (For clarity in presentation here and in the forthcoming theory section, time relationship between the sources A and B and the microphones 10 and 12 are described as if the electrical signal 14 generated by the microphone 10 were simultaneous with source A and the electrical signal 16 generated by the microphone 12 were simultaneous with source B. This determines the two-arbitrary additive time constants that one is free to choose in each channel.) Thus, the electrical signal 16 generated by the microphone 12 is an electrical representation of the sound source B plus a delayed copy of source A. Similarly, the electrical signal 14 generated by the microphone 10 is an electrical representation of the sound source A and a delayed copy of sound source B. By delaying the electrical signal 14 an appropriate amount, the electrical signal supplied to the negative input of the combiner 38 would represent a delayed copy of source A plus a further delayed copy of source B. The subtraction of the signal from the delay line 32 and digital signal 16 would remove the signal component representing the delayed copy of sound source A, leaving only the pure sound B (along with the further delayed copy of B).

The amount of delay to be set for each of the digital delay lines 32 and 34 can be supplied from the DOA estimator 20. Numerous methods for estimating the relative time delays have been described in the prior art (for example, Schmidt, 1981; Roy et al., 1988; Morita, 1991; Allen, 1991). Thus, the DOA estimator 20 is well known in the art.

In a different embodiment, omni-directional microphones 10 and 12 could be replaced by directional microphones placed very close together. Then all delays would be replaced by multipliers; in particular, digital delay lines 32 and 34 would be replaced by multipliers. Each multiplier would receive the signal from its respective A/D converter and generate a scaled signal, which can be either positive or negative, in response.

Figure 3:
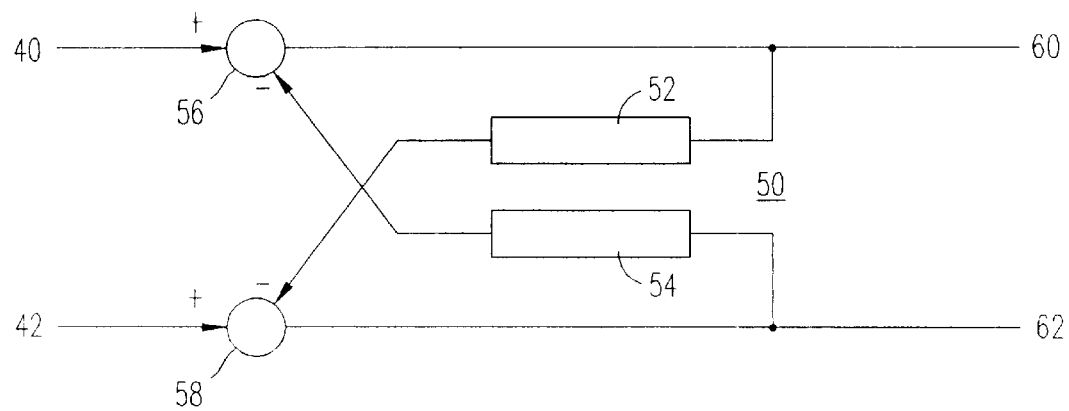
FIG. 3 is a schematic block diagram of an embodiment of the crosstalk remover portion, i.e., the second stage of the processor shown in FIG. 1.

A preferred embodiment of the crosstalk remover 50 is shown in greater detail in FIG. 3. The crosstalk remover 50 comprises a third combiner 56 for receiving the first output signal 40 from the direct signal separator 30. The third combiner 56 also receives, at its negative input, the output of a second adaptive filter 54. The output of the third combiner 56 is supplied to a first adaptive filter 52. The output of the first adaptive filter 52 is supplied to the negative input of the fourth combiner 58, to which the second output signal 42 from the direct signal separator 30 is also supplied. The outputs of the third and fourth combiners 56 and 58 respectively, are the output signals 60 and 62, respectively of the crosstalk remover 50.

Figure 5:
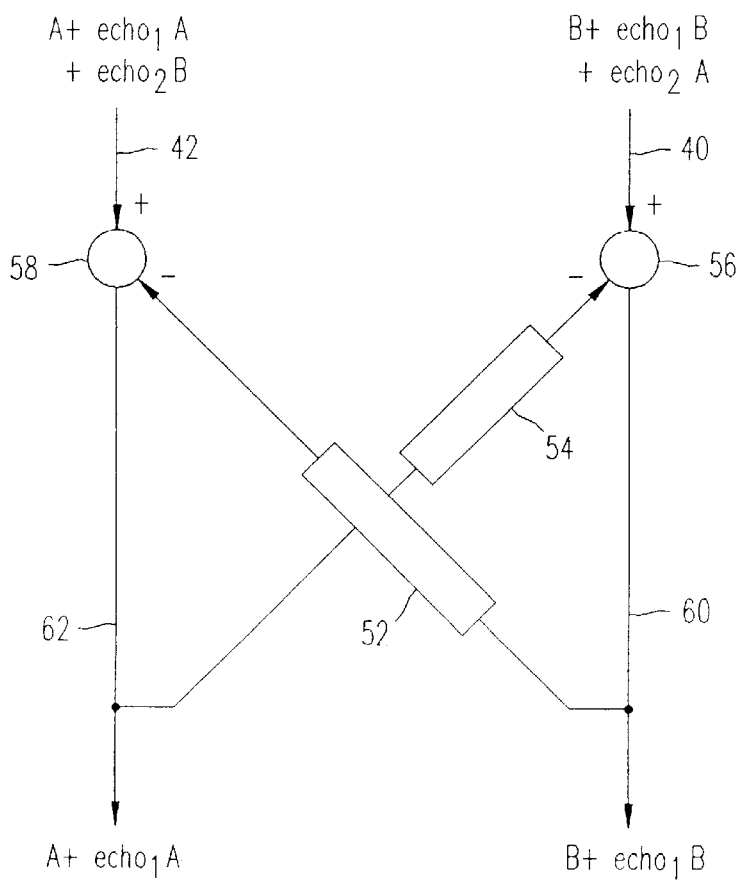
FIG. 5 is an overview of a portion of the crosstalk remover of the signal processor of FIG. 1 showing the removal of the crosstalk from one of the signal channels.

Schematically, the function of the crosstalk remover 50 may be seen by referring to FIG. 5. The inputs 40 and 42 to the crosstalk remover 50 are the outputs of the direct-signal separator 30. Let us assume that the direct-signal separator 30 has become fully adapted, i.e., (a) that the electrical signal 40 represents the acoustic wave signals of source B and its echoes and reverberation, plus echoes and reverberation of source A, and similarly (b) that the electrical signal 42 represents the acoustic wave signals of source A and its echoes and reverberation, plus echoes and reverberation of source B. Because the crosstalk remover 50 is a feedback network, it is easiest to analyze subject to the assumption that adaptive filters 52 and 54 are fully adapted, so that the electrical signals 62 and 60 already correspond to colored versions of B and A, respectively. The processing of the electrical signal 60 by the adaptive filter 52 will generate an electrical signal equal to the echoes and reverberation of source B present in the electrical signal 42; hence subtraction of the output of adaptive filter 52 from the electrical signal 42 leaves output signal 62 with signal components only from source A. Similarly, the processing of the electrical signal 62 by the adaptive filter 54 will generate an electrical signal equal to the echoes and reverberation of source A present in the electrical signal 40; hence subtraction of the output of adaptive filter 54 from the electrical signal 40 leaves output signal 60 with signal components only from source B.

Theory

It is assumed, solely for the purpose of designing the direct-signal separator 30, that the microphones 10 and 12 are omnidirectional and matched in sensitivity.

Under anechoic conditions, the signals $x_1(t)$ and $x_2(t)$, which correspond to the input signals, received by microphones 10 and 12, respectively, may be modeled as $$x_1(t) = w_1(t) + w_2(t-\tau_2)$$

$$x_2(t) = w_2(t) + w_1(t-\tau_1),$$

where $w_1(t)$ and $w_2(t)$ are the original source signals, as they reach microphones 10 and 12, respectively, and $\tau_1$ and $\tau_2$ are unknown relative time delays, each of which may be positive or negative.

Practitioners experienced in the art will recognize that bounded "negative" time delays can be achieved by adding a net time delay to the entire system.

The relative time delays $\tau_1$ and $\tau_2$ are used to form outputs $y_1(t)$ and $y_2(t)$, which correspond to signals 40 and 42:

$$y_1(t) = x_1(t) - x_2(t-\tau_2) = w_1(t) - w_1(t-(\tau_1+\tau_2))$$

$$y_2(t) = x_2(t) - x_1(t-\tau_1) = w_2(t) - w_2(t-(\tau_1+\tau_2))$$

As depicted in FIG. 2, these operations are accomplished by time-delay units 32 and 34, and combiners 36 and 38.

Under anechoic conditions, these outputs 40 and 42, would be fully separated; i.e., each output 40 or 42 would contain contributions from one source alone. However under echoic conditions these outputs 40 and 42 are not fully separated.

Under echoic and reverberant conditions, the microphone signals $x_1(t)$ and $x_2(t)$, which correspond to input signals received by the microphones 10 and 12, respectively, may be modeled as $$x_1(t) = w_1(t) + w_2(t-\tau_2) + k_{11}'(t)*w_1(t) + k_{12}'(t)*w_2(t)$$

$$x_2(t) = w_2(t) + w_1(t-\tau_1) + k_{21}'(t)*w_1(t) + k_{22}'(t)*w_2(t),$$

where the symbol "*" denotes the operation of convolution, and the impulse responses $k_{11}'(t)$, $k_{12}'(t)$, $k_{21}'(t)$, and $k_{22}'(t)$ incorporate the effects of echoes and reverberation.

Specifically, $k_{11}'(t)*w_1(t)$ represents the echoes and reverberations of source 1 ($w_1(t)$) as received at input 1 (microphone 10), $k_{12}'(t)*w_2(t)$ represents the echoes and reverberations of source 2 ($w_2(t)$) as received at input 1 (microphone 10 ), $k_{21}'(t)*w_1(t)$ represents the echoes and reverberations of source 1 ($w_1(t)$) as received at input 2 (microphone 12), and $k_{22}'(t)*w_2(t)$ represents the echoes and reverberations of source 2 ($w_2(t)$) as received at input 2 (microphone 12).

In consequence of the presence of echoes and reverberation, the outputs 40 and 42 from the direct-signal separator 30 are not fully separated, but instead take the form $$y_1(t) = x_1(t) - x_2(t-\tau_2) = w_1(t) - w_1(t-(\tau_1+\tau_2)) + k_{11}(t)*w_1(t) + k_{12}(t)*w_2(t)$$

$$y_2(t) = x_2(t) - x_1(t-\tau_1) = w_2(t) - w_2(t-(\tau_1+\tau_2)) + k_{21}(t)*w_1(t) + k_{22}(t)*w_2(t)$$

where the filters $k_{11}(t)$, $k_{12}(t)$, $k_{21}(t)$, and $k_{22}(t)$ are related to $k_{11}'(t)$, $k_{12}'(t)$, $k_{21}'(t)$, and $k_{22}'(t)$ by time shifts and linear combinations. Specifically, $$k_{11}(t) = k_{11}'(t) - k_{21}'(t-\tau_2),$$

$$k_{12}(t) = k_{12}'(t) - k_{22}'(t-\tau_2),$$

$$k_{21}(t) = k_{21}'(t) - k_{11}'(t-\tau_1), \text{ and}$$

$$k_{22}(t) = k_{22}'(t) - k_{12}'(t-\tau_1).$$

Note that $y_1(t)$ is contaminated by the term $k_{12}(t)*w_2(t)$, and that $y_2(t)$ is contaminated by the term $k_{21}(t)*w_1(t)$.

Several possible forms of the crosstalk remover have been described as part of the background of this invention, under the heading of convolutive blind source separation. In the present embodiment, the crosstalk remover forms discrete time sampled outputs 60 and 62 thus:

$$z_1(n) = y_1(n) - \sum_{k=1}^{1000} h_2(k) z_2(n-k)$$

$$z_2(n) = y_2(n) - \sum_{k=1}^{1000} h_1(k) z_1(n-k)$$

where the discrete time filters $h_1$ and $h_2$ correspond to elements 52 and 54 in FIG. 3 and are estimated adaptively. The filters $h_1$ and $h_2$ are strictly causal, i.e., they operate only on past samples of $z_1$ and $Z_2$. This structure was described independently by Jutten et al. (1992) and by Platt and Faggin (1992).

The adaptation rule used for the filter coefficients in the preferred embodiment is a variant of the LMS rule ("Adaptive Signal Processing," Bernard Widrow and Samuel D. Stearns, Prentice-Hall, Englewood Cliffs, N.J., 1985, p 99). The filter coefficients are updated at every time-step n, after the new values of the outputs $z_1(n)$ and $Z_2(n)$ have been calculated. Specifically, using these new values of the outputs, the filter coefficients are updated as follows :

$$h_1(k)[\text{new}] = h_1(k)[\text{old}] + m\, z_2(n) z_1(n-k) \quad k=1,2,\ldots,1000$$

$$h_2(k)[\text{new}] = h_2(k)[\text{old}] + m\, z_1(n) z_2(n-k) \quad k=1,2,\ldots,1000$$

where m is a constant that determines the rate of adaptation of the filter coefficients, e.g. 0.15 if the input signals 10 and 12 were normalized to lie in the range $-1 \leq x(t) \leq +1$. One skilled in the art will recognize that the filters $_1$ and $h_2$ can be implemented in a variety of ways, including FIRs and lattice IIRs.

As described, the direct-signal separator 30 and crosstalk remover 50 adaptively bring about full separation of two sound sources mixed in an echoic, reverberant acoustic environment. However, the output signals $z_1(t)$ and $z_2(t)$ may be unsatisfactory in practical applications because they are colored versions of the original sources $w_1(t)$ and $w_2(t)$ i.e., $$z_1 = \zeta_1(t) * w_1(t)$$

$$z_2 = \zeta_2(t) * w_2(t)$$

where $\zeta_1(t)$ and $\zeta_2(t)$ represent the combined effects of the echoes and reverberations and of the various known signal transformations performed by the direct-signal separator 30 and crosstalk remover 50.

As an optional cosmetic improvement for certain commercial applications, it may be desirable to append filters 70 and 72 to the network. The purpose of these filters is to undo the effects of filters $\zeta_1(t)$ and $\zeta_2(t)$. As those familiar with the art will realize, a large body of techniques for performing this inversion to varying and predictable degrees of accuracy currently exist.

The embodiment of the signal processor 8 has been described in FIGS. 1–5 as being useful with two microphones 10 and 12 for separating two sound sources, A and B. Clearly, the invention is not so limited. The forthcoming section describes how more than two microphones and sound sources can be accomodated.

General Case with M Microphones and M Sources

The invention is able to separate an arbitrary number M of simultaneous sources, as long as they are statistically independent, if there are at least M microphones.

Let $w_j(t)$ be the j'th source signal and $x_i(t)$ be the i'th microphone (mic) signal. Let $t_{ij}$ be the time required for sound to propagate from source j to mic i, and let $d(t_{ij})$ be the impulse response of a filter that delays a signal by $t_{ij}$. Mathematically, $d(t_{ij})$ is the unit impulse delayed by $t_{ij}$, that is $$d(t_{ij}) = \delta(t - t_{ij})$$

where $\delta(t)$ is the unit impulse function ("Circuits, Signals and Systems", by William McC. Siebert. The MIT Press, McGraw Hill Book Company, 1986, p. 319).

In the absence of echoes and reverberation, the i'th mic signal $x_i(t)$ can be expressed as a sum of the appropriately delayed j source signals $$x_i(t) = \sum_{j=1}^{M} d(t_{ij}) * w_j(t)$$

Matrix representation allows a compact representation of this equation for all M mic signals:

$$X(t) = D(t) * W(t)$$

where $X(t)$ is an M-element column vector whose i'th element is the i'th mic signal $x_i(t)$, $D(t)$ is an M×M element square matrix whose ij'th element (ie., the element in the i'th row and j'th column) is $d(t_{ij})$, and $W(t)$ is an M-element column vector whose j'th element is the j'th source signal $w_j(t)$. Specifically, $$X(t) = \begin{bmatrix} x_1(t) \\ x_2(t) \\ \vdots \\ x_M(t) \end{bmatrix};$$

$$D(t) = \begin{bmatrix} d(t_{11}) & d(t_{12}) & \cdots & d(t_{1M}) \\ d(t_{21}) & d(t_{22}) & \cdots & d(t_{2M}) \\ \cdots & \cdots & & \cdots \\ \cdots & \cdots & & \cdots \\ d(t_{M1}) & d(t_{M2}) & \cdots & d(t_{MM}) \end{bmatrix};$$

-continued $$W(t) = \begin{bmatrix} w_1(t) \\ w_2(t) \\ \vdots \\ w_M(t) \end{bmatrix}$$

For each source $w_j(t)$, if the delays $t_{ij}$ for i=1,2, . . . , M to the M mics are known (up to an arbitrary constant additive factor that can be different for each source), then M signals $y_j(t)$, j=1,2, . . . , M, that each contain energy from a single but different source $w_j(t)$, can be constructed from the mic signals $x_i(t)$ as follows:

$$y(t) = adjD(t) * x(t),$$

where $$Y(t) = \begin{bmatrix} y_1(t) \\ y_2(t) \\ \vdots \\ y_M(t) \end{bmatrix}$$

is the M-element column vector whose j'th element is the separated signal $y_j(t)$, and adjD(t) is the adjugate matrix of the matrix D(t). The adjugate matrix of a square matrix is the matrix obtained by replacing each element of the original matrix by its cofactor, and then transposing the result ("Linear Systems", by Thomas Kailath, Prentice Hall, Inc., 1980, p. 649). The product of the adjugate matrix and the original matrix is a diagonal matrix, with each element along the diagonal being equal to the determinant of the original matrix. Thus, $$Y(t) = adjD(t) * X(t)$$
$$= adjD(t) * D(t) * W(t)$$
$$= \begin{bmatrix} |D(t)| & 0 & 0 \cdots 0 \\ 0 & |D(t)| & 0 \cdots 0 \\ \vdots & & \ddots & \vdots \\ 0 & 0 & \cdots |D(t)| \end{bmatrix} * W(t)$$
$$= |D(t)| * W(t)$$

where $|D(t)|$ is the determinant of D(t). Thus, $$y_j(t) = |D(t)| * w_j(t) \text{ for } j=1,2,\ldots,M$$

$y_j(t)$ is a "colored" or filtered version of $w_j(t)$ because of the convolution by the filter impulse response $|D(t)|$. If desired, this coloration can be undone by post filtering the outputs by a filter that is the inverse of $|D(t)|$. Under certain circumstances, determined by the highest frequency of interest in the source signals and the separation between the mics, the filter $|D(t)|$ may have zeroes at certain frequencies; these make it impossible to exactly realize the inverse of the filter $|D(t)|$. Under these circumstances any one of the numerous techniques available for approximating filter inverses (see, for example, "Digital Filters and Signal Processing", by Leland B. Jackson, Kluwer Academic Publishers, 1986, p.146) may be used to derive an approximate filter with which to do the post filtering.

The delays $t_{ij}$ can be estimated from the statistical properties of the mic signals, up to a constant additive factor that can be different for each source. This is the subject of a co-pending patent application by the same inventors, filed even date herewith. Alternatively, if the position of each microphone and each source is known, then the delays $t_{ij}$ can be calculated exactly. For any source that is distant, i.e., many times farther than the greatest separation between the mics, only the direction of the source is needed to calculate its delays to each mic, up to an arbitrary additive constant.

The first stage of the processor 8, namely the direct signal separator 30, uses the estimated delays to construct the adjugate matrix adjD(t), which it applies to the microphone signals X(t) to obtain the outputs Y(t) of the first stage, given by:

$$Y(t)=adjD(t)*X(t).$$

In the absence of echoes and reverberations, each output $y_j(t)$ contains energy from a single but different source $w_j(t)$.

When echoes and reverberation are present, each mic receives the direct signals from the sources as well as echoes and reverberations from each source. Thus $$x_i(t) = \sum_{j=1}^{M} d(t_{ij})*w_j(t) + \sum_{j=1}^{M} e_{ij}(t)*w_j(t) \text{ for } i = 1, 2, \ldots, M$$

where $e_{ij}(t)$ is the impulse response of the echo and reverberation path from the j'th source to the i'th mic. All M of these equations can be represented in compact matrix notation by $$X(t)=D(t)*W(t)+E(t)*W(t)$$

where E(t) is the M×M matrix whose ijth element is the fitter $e_{ij}(t)$.

If the mic signals are now convolved with the adjugate matrix of D(t), instead of obtaining separated signals we obtain partially separated signals:

$$Y(t) = adjD(t)*X(t)$$
$$= |D(t)|*W(t) + adjD(t)*E(t)*W(t)$$

Notice that each $y_j(t)$ contains a colored direct signal from a single source, as in the case with no echoes, and differently colored components from the echoes and reverberations of every source, including the direct one.

The echoes and reverberations of the other sources are removed by the second stage of the network, namely the crosstalk remover 50, which generates each output as follows:

$$z_j(t) = y_j(t) - \sum_{\substack{k=1 \\ k \neq j}}^{M} h_{jk}(t)*z_k(t) \text{ for } j = 1, 2, \ldots, M$$

where the entities $h_{jk}(t)$ are causal adaptive filters. (The term "causal" means that $h_{jk}(t)=0$ for $t \leq 0$.) In matrix form these equations are written as $$Z(t)=Y(t)-H(t)*Z(t)$$

where Z(t) is the M-element column vector whose j'th element is $z_j(t)$, and H(t) is an M×M element matrix whose diagonal elements are zero and whose off diagonal elements are the causal, adaptive filters $h_{jk}(t)$.

These filters are adapted according to a rule that is similar to the Least Mean Square update rule of adaptive filter theory ("Adaptive Signal Processing," Bernard Widrow and Samuel D. Stearns, Prentice-Hall, Englewood Cliffs, N.J., 1985, p. 99).

This is most easily illustrated in the case of a discrete time system.

Illustrative Weight Update Methodology for Use with a Discrete Time Representation First, we replace the time parameter by a discrete time index n. Second, we use the notation H(n)[new] to indicate the value of H(n) in effect just before computing new outputs at time n. At each time step n, the outputs Z(n) are computed according to $$Z(n)=Y(n)-H(n)[\text{new}]*Z(n)$$

Note that the convolution on the right hand side involves only past values of Z, ie Z(n−1), Z(n−2), . . . , Z(n−N), because the filters that are the elements of H are causal. (N is defined to be the order of the filters in H).

Now new values are computed for the coefficients of the filters that are the elements of H. These will be used at the next time step. Specifically, for each j and each k, with j≠k, perform the following:

$$h_{jk}(u)[\text{old}] = h_{jk}(u)[\text{new}] \quad u = 1, 2, \ldots, M$$
$$h_{jk}(u)[\text{new}] = h_{jk}(u)[\text{old}] + \mu_{jk} z_j(n) z_k(n-u) \quad u = 1, 2, \ldots, M$$

The easiest way to understand the operation of the second stage is to observe that the off-diagonal elements of H(t) have zero net change per unit time when the products like $z_j(t)z_k(t-u)$ are zero on average. Because the sources in W are taken to be statistically independent of each other, those products are zero on average when each output $z_j(t)$ has become a colored version of a different source, say $w_j(t)$. (The correspondence between sources and outputs might be permuted so that the numbering of the sources does not match the numbering of the outputs.)

More specifically, let $Z(t)=\psi(t)*W(t)$. From the preceding paragraph, equilibrium is achieved when $\psi(t)$ is diagonal. In addition, it is required that:

$$Z(t) = Y(t) - H(t)*\Psi(t)*W(t)$$
$$= |D(t)|*W(t) + adjD(t)*E(t)*W(t) - H(t)*\Psi(t)*W(t)$$
$$= (|D(t)|I + adjD(t)*E(t)* - H(t)*\Psi(t))*W(t)$$

so that $$\Psi(t)=|D(t)|I+adjD(t)*E(t)-H(t)*\Psi(t)$$

$$\Psi(t)=[1+H(t)]^{-1}[|D(t)|I+adjD(t)*E(t)]$$

This relation determines the coloration produced by the two stages of the system, taken together.

An optional third stage can use any one of numerous techniques available to reduce the amount of coloration on any individual output.

Example of General Case with M=3, i.e. with 3 Mics and 3 Sources

In the case where there are 3 mics and 3 sources, the general matrix equation $$X=D*W$$

becomes $$\begin{bmatrix} x_1 \\ x_2 \\ x_3 \end{bmatrix} = \begin{bmatrix} d(t_{11}) & d(t_{12}) & d(t_{13}) \\ d(t_{21}) & d(t_{22}) & d(t_{23}) \\ d(t_{31}) & d(t_{32}) & d(t_{33}) \end{bmatrix} * \begin{bmatrix} w_1 \\ w_2 \\ w_3 \end{bmatrix}$$

If the delays $t_{ij}$ are known, then the adjugate matrix of D(t) is given by $$adjD = \begin{bmatrix} d(t_{22}+t_{33})-d(t_{23}+t_{32}) & d(t_{13}+t_{32})-d(t_{12}+t_{33}) & d(t_{12}+t_{23})-d(t_{22}+t_{13}) \\ d(t_{23}+t_{31})-d(t_{21}+t_{33}) & d(t_{11}+t_{33})-d(t_{13}+t_{31}) & d(t_{21}+t_{13})-d(t_{11}+t_{23}) \\ d(t_{21}+t_{32})-d(t_{22}+t_{31}) & d(t_{12}+t_{31})-d(t_{11}+t_{32}) & d(t_{11}+t_{22})-d(t_{21}+t_{12}) \end{bmatrix}$$

Note that adding a constant delay to the delays associated with any column of D(t) leaves the adjugate matrix unchanged. This is why the delays from a source to the three mics need only be estimated up to an arbitrary additive constant.

The output of the first stage, namely the direct signal separator 30, is formed by convolving the mic signals with the adjugate matrix.

$$\begin{bmatrix} y_1 \\ y_2 \\ y_3 \end{bmatrix} = adjD * \begin{bmatrix} x_1 \\ x_2 \\ x_3 \end{bmatrix}$$

Figure 6:
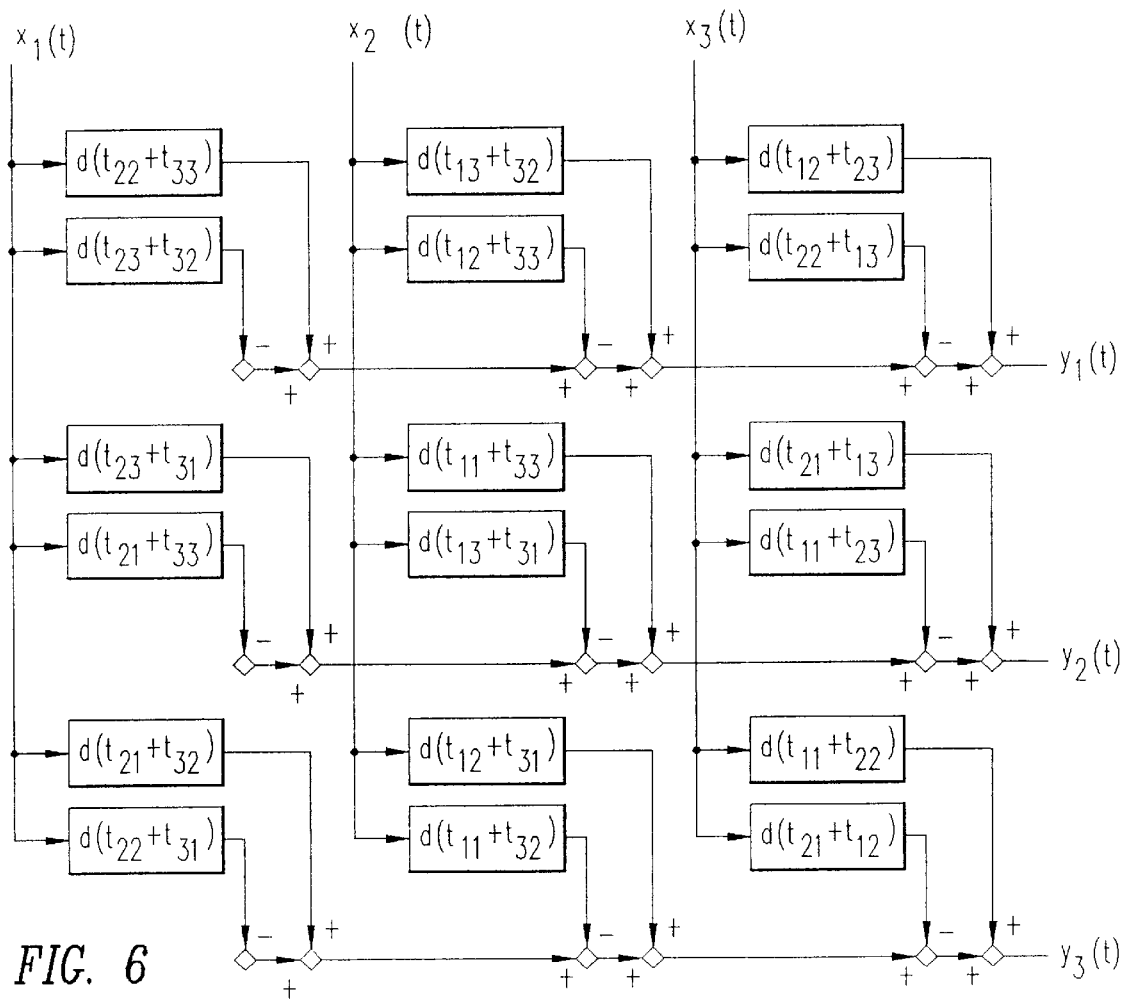
FIG. 6 is a detailed schematic block diagram of an embodiment of a direct-signal separator using three microphones.

The network that accomplishes this is shown in FIG. 6.

In the absence of echoes and reverberations, the outputs of the first stage are the individual sources, each colored by the determinant of the delay matrix.

$$\begin{bmatrix} y_1(t) \\ y_2(t) \\ y_3(t) \end{bmatrix} = adjD * D(t)$$

$$\begin{bmatrix} w_1(t) \\ w_2(t) \\ w_3(t) \end{bmatrix} = |D(t)| * \begin{bmatrix} w_1(t) \\ w_2(t) \\ w_3(t) \end{bmatrix}$$

Figure 7:
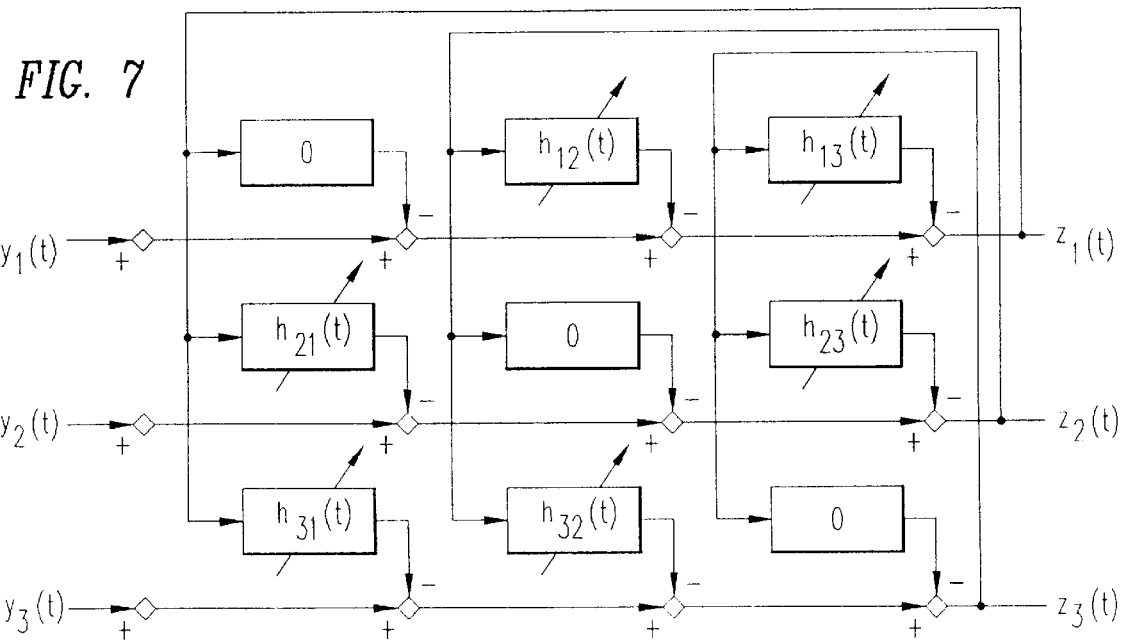
FIG. 7 is a detailed schematic block diagram of an embodiment of a crosstalk remover suitable using three microphones.

In the general case when echoes and reverberation are present, each output of the first stage also contains echoes and reverberations from each source. The second stage, namely the cross talk remover 50, consisting of a feedback network of adaptive filters, removes the effects of these unwanted echoes and reverberations to produce outputs that each contain energy only one different source, respectively. The matrix equation of the second stage $$Z=Y-H*Z$$

becomes $$\begin{bmatrix} z_1(t) \\ z_2(t) \\ z_3(t) \end{bmatrix} = \begin{bmatrix} y_1(t) \\ y_2(t) \\ y_3(t) \end{bmatrix} - \begin{bmatrix} 0 & h_{12}(t) & h_{13}(t) \\ h_{21}(t) & 0 & h_{23}(t) \\ h_{31}(t) & h_{32}(t) & 0 \end{bmatrix} * \begin{bmatrix} z_1(t) \\ z_2(t) \\ z_3(t) \end{bmatrix}$$

where each $h_{ij}$ is a causal adaptive filter. The network that accomplishes this is shown in FIG. 7.

Conclusion

It should be noted that the number of microphones and associated channels of signal processing need not be as large as the total number of sources present, as long as the number of sources emitting a significant amount of sound at any given instant in time does not exceed the number of microphones. For example, if during one interval of time only sources A and B emit sound, and in another interval of time only sources B and C emit sound, then during the first interval the output channels will correspond to A and B respectively, and during the second interval the output channels will correspond to B and C respectively.

As previously discussed, in the preferred embodiment of the present invention, the invention has been implemented in software, as set forth in the microfiche appendix. The software code is written in the C++ language for execution on a workstation from Silicon Graphics. However, as previously discussed, hardware implementation of the present invention is also contemplated to be within the scope of the present invention. Thus, for example, the direct signal separator 30 and the crosstalk remover 50 can be a part of a digital signal processor, or can be a part of a general purpose computer, or can be a part of analog signal processing circuitry. In addition, the present invention is not limited to the processing of acoustic waves. It can be used to process signals, having a delay with the problem of separation of the signals from the sources.

There are many advantages and differences of the present invention from the prior art.

1. Although the present invention is similar in objective to sound separation based on auditory scene analysis, it differs from them in principle and in technique.

2. In contrast with approaches based on auditory scene analysis, this invention separates sounds by exploiting the separation of their sources in space and their statistical independence.

3. The present invention differs from directional microphones in that few presuppositions are made with regard to the locations of sound sources relative to the device. The present device need not be pointed at or mounted close to a source of interest. The necessary selectivity is brought about by processing of signals captured by a microphone array, i.e., a collection of microphones. Moreover, the selectivity attained is much greater: a directional microphone cannot completely suppress any source of sound.

4. While the prior art nonlinear techniques can be very computationally efficient and are of scientific interest as models of human cocktail-party processing, they are of less practical or commercial significance than the present invention because of their inherent inability to bring about full suppression of unwanted sources. This inability originates from the incorrect assumption that at every instant in time, at least one microphone contains only the desired signal. The present invention differs from these nonlinear techniques in that linear operations (addition, subtraction, and filtering) are employed to cancel unwanted sources.

5. The present invention is an example of "active cancellation." In contrast with classical beamforming, which aligns copies of a desired source in time and adds them together, active cancellation matches copies of undesired sources and subtracts them to bring about cancellation. ("Matching" the copies of the undesired sources generally entails more than simply re-aligning them in time; usually, it involves re-shaping them by filtering.) Bearing this simplified explanation in mind, it may be seen that the degree of selectivity achieved by active cancellation is determined by factors rather different from those important in classical beamforming. In active cancellation, the degree of selectivity is determined by the exactness with which identical copies of unwanted sources can be created from different microphones for subsequent cancellation. In contrast with a classical beamformer, a sound-separation device that employs active cancellation can in principle remove one undesired source completely using just two microphones.

6. The present invention also does not need a reference sound.

7. In contrast with active-cancellation algorithms that require a reference signal, the present invention operates "blindly": it accommodates the more difficult case in which all of the signals directly available for processing, i.e., the microphone signals, are assumed to be mixtures of sources. The present invention is a method for bringing about blind separation of sources, given the direction of arrival (DOA) of each source. This DOA information may be obtained in a variety of ways, for example by direct specification from a human user or by statistical estimation from the microphone signals. Precisely how DOA information is obtained is immaterial in the context of the present invention; what is important is how DOA information is used to bring about source separation.

8. The present invention differs from gain-based active cancellation in that it requires no assumption of simultaneity of signal reception at all of the microphones.

9. In contrast with purely delay-based active cancellation and variants that introduce simple gains in addition to delays (e.g., Platt & Faggin, 1992), the present invention is based on an acoustic model that includes the effects of echoes and reverberation.

10. Single-stage techniques for blind, convolutive active cancellation are usually unable to separate mixtures that are not already partially separated.

11. Two prior art techniques for blind, convolutive active cancellation are, like the present invention, based on a two-stage architecture. Of these, the technique of Najar et al. (1994) differs from the present invention in that each output channel of its first stage is a filtered version of only one input channel. Therefore, the first stage of the system described by Najar et al. (1994) cannot bring about full separation even in the absence of echoes and reverberation, unless the original sources have no overlapping spectral components.

12. The other prior art technique based on a two-stage architecture is the Griffiths-Jim beamformer (Griffiths and Jim, 1982). The Griffiths-Jim beamformer employs active cancellation in its second stage that requires a reference signal. The necessary reference noise signal is produced by the first stage, using known DOA information. If this reference noise signal contains a significant amount of the desired signal, then the second stage will erroneously enhance the noise and suppress the desired signal (Van Compernolle, 1989). In the present invention, the second stage is blind; it employs its own outputs as reference signals. Unlike the Griffiths-Jim reference signal, these become progressively purer with time as the network adapts.

What is claimed is:

1. A signal processing system for processing waves from a plurality of sources, said system comprising:

a plurality of transducer means for receiving waves from said plurality of sources, including echoes and reverberation thereof and for generating a plurality of signals in response thereto, wherein each of said plurality of transducer means receives waves from said plurality of sources including echoes and reverberations thereof, and for generating one of said plurality of signals;

first processing means for receiving said plurality of signals and for generating a plurality of first processed signals in response thereto, said first processing means comprises:

a plurality of delay means, each for receiving one of said plurality of signals and for generating a delayed signal in response thereto, and a plurality of first combining means, each for receiving at least one of said plurality of signals and one of said delayed signals not associated with said one of said plurality of signals, and for combining said received delayed signal and said signal, by an active cancellation process, to produce one of said first processed signals; and second processing means for receiving said plurality of first processed signals and for generating a plurality of second processed signals in response thereto, wherein each of said second processed signals represents waves from one different source, said second processing means including feedback means for supplying said plurality of second processed signals to said second processing means for combining each of said plurality of second processed signals with at least one of said plurality of first processed signals not associated with said each second processed signal to generate said plurality of second processed signals.

2. A signal processing system for processing waves from a plurality of sources, said system comprising:

a plurality of transducer means for receiving waves from said plurality of sources, including echoes and reverberation thereof and for generating a plurality of signals in response thereto, wherein each of said plurality of transducer means receives waves from said plurality of sources including echoes and reverberations thereof, and for generating one of said plurality of signals;

first processing means for receiving said plurality of signals and for generating a plurality of first processed signals in response thereto, said first processing means comprises:

a plurality of multiplying means, each for receiving different ones of said plurality of signals and for generating a scaled signal in response thereto, and a plurality of first combining means, each for receiving at least one of said plurality of signals and one scaled signal not associated with said one of said plurality of signals, and for combining said received scaled signal and said signal to produce one of said first processed signals; and second processing means for receiving said plurality of first processed signals and for generating a plurality of second processed signals in response thereto, wherein each of said second processed signals represents waves from one different source, said second processing me including feedback means for supplying said plurality of second processed signals to said second processing means for combining each of said plurality of second processed signals with at least one of said plurality of first processed signals not associated with said each second processed signal to generate said plurality of second processed signals.

3. The system of claim 1, further comprising:
means for generating a direction of arrival signal for said waves; and
wherein said first processing means generates said plurality of first processed signals, in response to said direction of arrival signal.

4. The system of claim 1, wherein the number of transducer means is two, the number of first processed signals is two, and the number of second processed signals is two.

5. The system of claim 1, wherein said transducer means are spaced apart omnidirectional microphones.

6. The system of claim 1 wherein said microphones are co-located directional microphones.

7. The system of claim 1, 3, 4, 5, 6, or 2 wherein said second processing means comprises:
a plurality of second combining means, each of said second combining means having a first input, at least one other input, and an output; each of said second combining means for receiving one of said first processed signals at said first input, an input signal at said other input, and for generating an output signal, at said output; said output signal being one of said plurality of second processed signals and is a difference between said first processed signal received at said first input and the sum of said input signal received at said other input;
a plurality of adaptive filter means for generating a plurality of adaptive signals, each of said adaptive filter means for receiving said output signal from one of said plurality of second combining means and for generating an adaptive signal in response thereto; and
means for supplying each of said plurality of adaptive signals to one of said other input of said plurality of second combining means other than the associated one of said second combining means.

8. The system of claim 7 further comprising means for filtering each of said second processed signals to generate a plurality of third processed signals.

9. The system of claim 8 wherein said second processed signals are characterized by having a low frequency component and a high frequency component, and wherein said filtering means boosts the low frequency component relative to the high frequency component of said second processed signals.

10. A signal processing system for processing waves from a plurality of sources, said system comprising:
a plurality of transducer means for receiving waves from said plurality of sources, including echoes and reverberations thereof and for generating a plurality of signals in response thereto, wherein each of said plurality of transducer means receives waves from said plurality of sources including echoes and reverberations thereof, and for generating one of said plurality of signals;
first processing means for receiving said plurality of signals and for generating a plurality of first processed signals in response thereto, wherein in the absence of echoes and reverberations of said waves from said plurality of sources, each of said first processed signals represents waves from only one different source; said first processing means comprising:
a plurality of delay means, each for receiving one of said plurality of signals and for generating a delayed signal in response thereto, and
a plurality of first combining means, for receiving said plurality of signals and for feedforward combining said plurality of signals in an active cancellation process to produce said plurality of processed signals, wherein each of said plurality of first combining means receives at least one of said plurality of signals and one of said delayed signals not associated with said one of said plurality of signals, and for combining said received delayed signal and said one signal to produce one of said first processed signals; and
second processing means for receiving said plurality of first processed signals and for generating a plurality of second processed signals in response thereto, wherein in the presence of echoes and reverberations of said waves from said plurality of sources, each of said second processed signals represents waves from one different source; said second processing means including feedback means for supplying said plurality of second processed signals to said second processing means for combining each of said plurality of second processed signals with at least one of said plurality of first processed signals not associated with said each second processed signal to generate said plurality of second processed signals.

11. A signal processing system for processing waves from a plurality of sources, said system comprising:
a plurality of transducer means for receiving waves from said plurality of sources, including echoes and reverberations thereof and for generating a plurality of signals in response thereto, wherein each of said plurality of transducer means receives waves from said plurality of sources including echoes and reverberations thereof, and for generating one of said plurality of signals;
first processing means for receiving said plurality of signals and for generating a plurality of first processed signals in response thereto, wherein in the absence of echoes and reverberations of said waves from said plurality of sources, each of said first processed signals represents waves from only one different source; said first processing means comprising:
a plurality of first combining means, for receiving said plurality of signals and for feedforward combining said plurality of signals in an active cancellation process to produce said plurality of processed signals,
a plurality of multiplying means, each for receiving different ones of said plurality of signals and for generating a scaled signal in response thereto; and
wherein each of said plurality of first combining means receives at least one scaled signal and one of said plurality of signals not associated with said one scaled signal, and for combining said received scaled signal and said signal to produce one of said first processed signals;
second processing means for receiving said plurality of first processed signals and for generating a plurality of second processed signals in response thereto, wherein in the presence of echoes and reverberations of said waves from said plurality of sources, each of said second processed signals represents waves from one different source; said second processing means including feedback means for supplying said plurality of second processed signals to said second processing means for combining each of said plurality of second processed signals with at least one of said plurality of first processed signals not associated with said each second processed signal to generate said plurality of second processed signals.

12. The system of claim 10 wherein said waves are acoustic waves, and said transducer means are microphones.

13. The system of claim 12 further comprising means for filtering each of said second processed signals to generate a plurality of third processed signals.

14. The system of claim 13 wherein said second processed signals are characterized by having a low frequency component and a high frequency component, and wherein said filtering means boosts the low frequency component relative to the high frequency component of said second processed signals.

15. The system of claim 10, wherein the number of transducer means is two, the number of first processed signals is two, and the number of second processed signals is two.

16. The system of claim 10, wherein said transducer means are spaced apart omnidirectional microphones.

17. The system of claim 10 wherein said microphones are co-located directional microphones.

18. The system of claim 10, 12, 13, 14, 15, 16, 17 or 11 wherein said second processing means comprises:
  a plurality of second combining means, each of said second combining means having a first input, at least one other input, and an output; each of said second combining means for receiving one of said first processed signals at said first input, an input signal at said other input, and for generating an output signal, at said output; said output signal being one of said plurality of second processed signals and is a difference between said first processed signal received at said first input and the sum of said input signal received at said other input;
  a plurality of adaptive filter means for generating a plurality of adaptive signals, each of said adaptive filter means for receiving said output signal from one of said plurality of second combining means and for generating an adaptive signal in response thereto; and
  means for supplying each of said plurality of adaptive signals to one of said other input of said plurality of second combining means other than the associated one of said second combining means.

19. The system of claim 18 wherein each of said adaptive filter means comprises a tapped delay line.

20. A method of processing waves from a plurality of sources, comprising:
  receiving said waves, including echoes and reverberations thereof, by a plurality of transducer means;
  converting said waves, including echoes and reverberations thereof from said plurality of sources, by each of said plurality of transducer means into an electrical signal, thereby generating a plurality of electrical signals;
  first processing said plurality of electrical signals, by an active cancellation process, to generate a plurality of first processed signals, wherein in the absence of echoes and reverberations of said waves from said plurality of sources, each of said first processed signals represents waves from one source, and a reduced amount of waves from other sources, said first processing step including:
    delaying each one of said plurality of electrical signals and generating a delayed signal in response thereto, and
    combining each one of said plurality of electrical signals with one of said delayed signals not associated with said one of said plurality of signals to generate one of said first processed signals; and then
  secondly processing said plurality of first processed signals to generate a plurality of second processed signals, including combining each of said plurality of second processed signals with at least one of said plurality of first processed signals not associated with said each second processed signal to generate said plurality of second processed signals, wherein in the presence of echoes and reverberations of said waves from said plurality of sources, each of said second processed signals represents waves from only one different source.

21. The method of claim 20 further comprising the step of:
  filtering each of said second processed signals to generate a plurality of third processed signals.

22. The method of claim 20 further comprising the step of:
  sampling and converting each one of said plurality of electrical signals and for supplying same to said plurality of delay means and to said plurality of combining means, as said electrical signal.

23. The method of claim 20 wherein said second processing step further comprises:
  subtracting, by a plurality of subtracting means, a different one of said first processed signals by an adaptive signal and generating an output signal, thereby generating a plurality of output signals;
  adaptively filtering said output signals to generate a plurality of adaptive signals; and
  supplying each one of said plurality of adaptive signals to a different one of said subtracting means.

24. A signal processing system for processing waves from a plurality of sources, said system comprising:
  at least a first and second transducer for receiving waves from said plurality of sources, including echoes and reverberation thereof and for generating at least a first and a second signal in response thereto, wherein each of said transducers receives waves from said plurality of sources including echoes and reverberations thereof, and for generating one of said first and second signals;
  first processing means for receiving said first and second signals and for generating a first and a second processed signals in response thereto, said first processing means comprises:
    first delay means for receiving said first signal and for generating a first delayed signal in response thereto,
    second delay means for receiving said second signal and for generating a second delayed signal in response thereto,
    first combining means for receiving said first signal and said second delayed signal, and for combining said received first signal and said second delay signal, by an active cancellation process, to produce said first processed signal, and
    second combining means for receiving said second signal and said first delayed signal, and for combining said received second signal and said first delayed signal, by an active cancellation process, to produce said second processed signal; and
  second processing means for receiving said first and second processed signals and for generating a third and a fourth processed signals in response thereto, said second processing means comprises:
    third combining means for receiving the first processed signal to produce the third processed signal in response thereto;
    fourth combining means for receiving the second processed signal to produce the fourth processed signal in response thereto;

first adaptive filter means for receiving said third processed signal, for generating a first adaptive signal in response thereto, and for supplying said first adaptive signal to said fourth combining means;

second adaptive filter means for receiving said fourth processed signal, for generating a second adaptive signal in response thereto, and for supplying said second adaptive signal to said third combining means;

wherein the third combining means combines the first processed signal and the second adaptive signal to produce the third processed signal so that the third processed signal is a difference between the first processed signal and the second adaptive signal; and wherein the fourth combining means combines the second processed signal and the first adaptive signal to produce the fourth processed signal so that the fourth processed signal is a difference between the second processed signal and the first adaptive signal.

* * * * *